(12) United States Patent
Benker et al.

(10) Patent No.: US 8,021,142 B2
(45) Date of Patent: Sep. 20, 2011

(54) THERMOFORMING APPARATUS AND METHOD

(75) Inventors: John Benker, South Dennis, MA (US); Philip Llewellyn, South Dennis, MA (US)

(73) Assignee: Sencorp, Inc., Hyannis, MA (US)

( * ) Notice: Subject to any disclaimer, the term of this patent is extended or adjusted under 35 U.S.C. 154(b) by 13 days.

(21) Appl. No.: 12/622,670

(22) Filed: Nov. 20, 2009

(65) Prior Publication Data

US 2011/0120282 A1    May 26, 2011

(51) Int. Cl.
*B29C 51/44* (2006.01)

(52) U.S. Cl. ...... 425/412; 425/422; 414/788.8; 414/790; 414/790.1; 414/790.2

(58) Field of Classification Search .......... 425/503, 425/506, 510, 519, 521, 412, 422; 264/545; 414/788.4, 788.5, 788.9, 789.5, 790, 790.1, 414/792, 792.9, 793.8
See application file for complete search history.

(56) References Cited

U.S. PATENT DOCUMENTS

| | | | |
|---|---|---|---|
| 4,105,736 A * | 8/1978 | Padovani | 425/387.1 |
| 5,980,231 A * | 11/1999 | Arends et al. | 425/397 |
| 6,648,043 B1 * | 11/2003 | Kundinger et al. | 425/508 |
| 6,769,862 B1 * | 8/2004 | Kuhl | 414/790.5 |
| 6,969,246 B1 * | 11/2005 | Kundinger et al. | 425/515 |

* cited by examiner

*Primary Examiner* — Robert B Davis
*Assistant Examiner* — Thu Khanh T Nguyen
(74) *Attorney, Agent, or Firm* — McHale & Slavin, P.A.

(57) ABSTRACT

Method and apparatus are provided for thermoforming articles. The apparatus includes an in line series of processing stations including heating, forming, cutting and separating stations. A stacker is provided to receive formed articles and form an x-y array of stacks of formed articles. A stack picker is provided that is operable to pick up the stacks of articles during a sheet pause cycle portion and move the picked stacks from a storage magazine to a deposit area. The movement of the stacks for depositing and the picker assembly back to the stacker can occur while the apparatus is producing and stacking additionally formed articles.

17 Claims, 4 Drawing Sheets

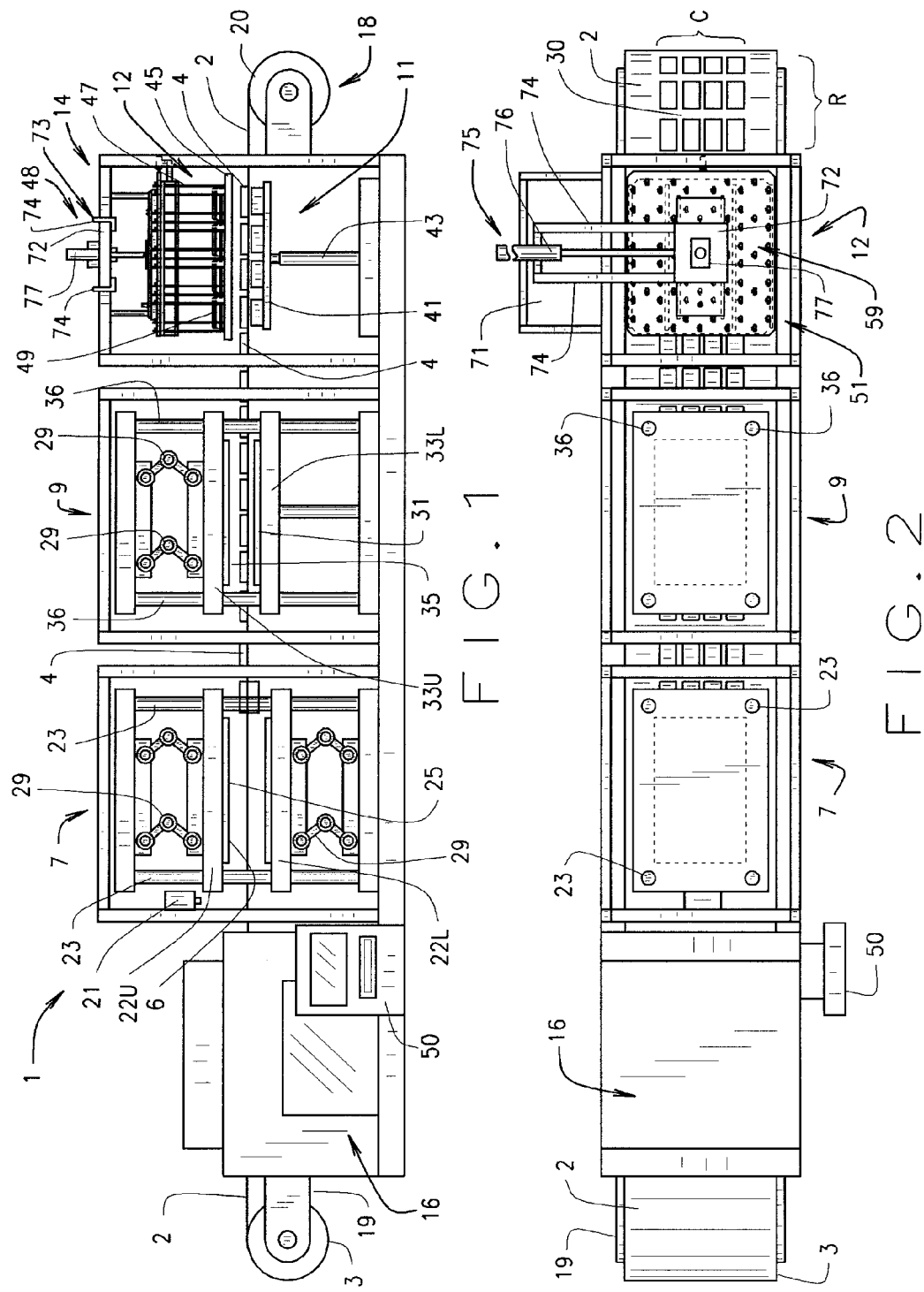

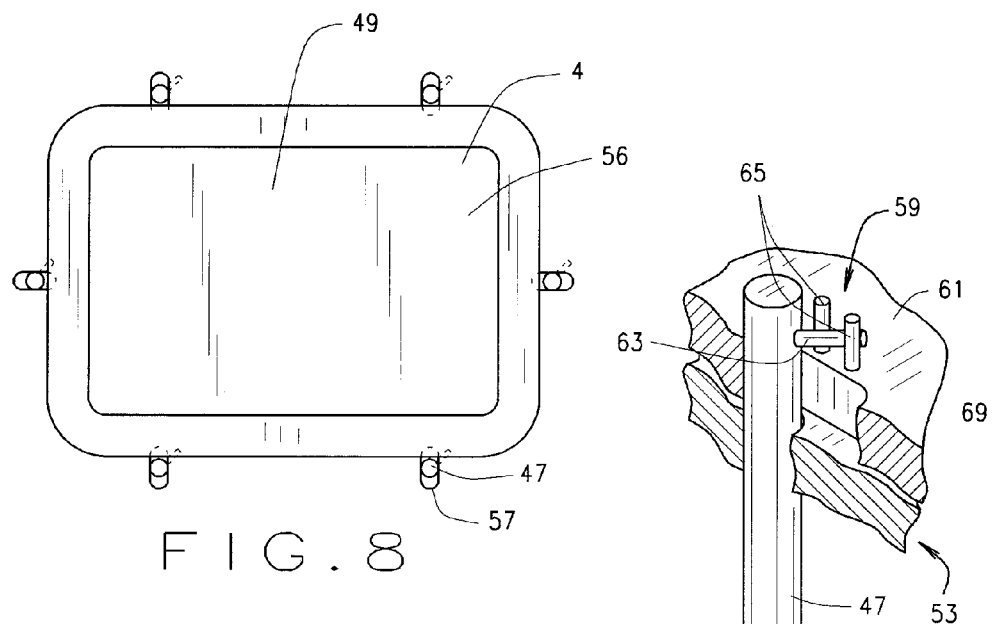
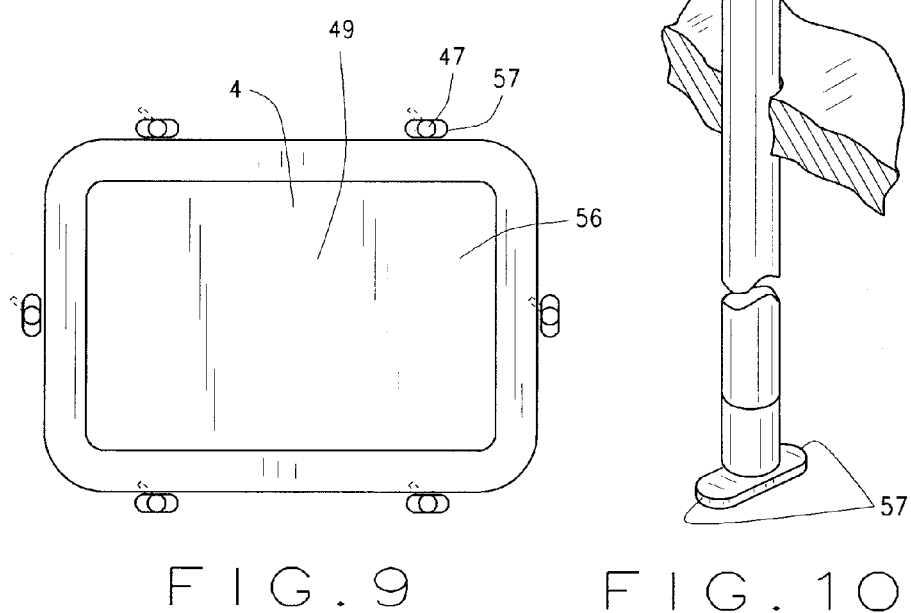

THERMOFORMING APPARATUS AND METHOD

FIELD OF INVENTION

The present invention relates to a thermoforming apparatus adapted to simultaneously form a plurality of connected articles in an x-y array, separate the formed articles from one another and stack the separated articles in a plurality of stacks in an x-y array. The stacks are then removed from the stacker by a picker assembly and moved to a storage area. The stack picking can be done during a normal pause cycle while the stack removal and depositing can be done while the apparatus continues to make articles with normal cycle times. The picker assembly can be returned to the stacking magazine during any portion of one or more machine cycles.

BACKGROUND OF THE INVENTION

The thermoforming of articles is well known in the art. Machines can be made to make single parts or simultaneously make a plurality of parts in an x-y array. In general, either a single sheet or roll sheet stock of formable material is heated and fed to a forming station and then through the application of force to the softened material is formed into one or more articles. When a plurality of articles are formed at one time from roll stock, they are connected by a web, at least along the outer longitudinal edges of the feed material. The articles are then separated from one another and the web typically by cutting with a die. The web can then be recycled if desired. The separated articles can be stacked and transferred to a storage or use area.

One early form of such a machine was available from Packaging Industries, Inc. of Hyannis, Mass. It was available in two models, the E-44 and the E-65. Both utilized an extruder to form the feed sheet of material. The machines though were not in line machines. Once parts were formed, they were first moved laterally to one side or the other of the machine before being transferred to other processing stations. These machines utilized stackers and stack pickers, however, the stack pickers were complicated and expensive.

One problem, particularly in the production of low margin products is cost. Each different article or different array of articles requires different tooling for forming, cutting and stacking. This increases the capital investment by manufactures which then gets passed on, at least partially, in the cost of goods. It also requires storage area for the tools. Stacking of finished parts and movement of the stacked parts can be done manually, but that also increases cost and can cause worker dissatisfaction because of the repetitive nature of the work. Another problem is that stacking and stack removal tend to be the bottleneck in the production process slowing down the operation of the other processing stations. One solution to this was the above mentioned machines that utilized a pair of processing lines to take outfeed from the molding station. This also increased machine cost and hence product cost or loss of profit. While stackers have been improved and simplified reducing their cost, stack pickers have lagged. Each different array in a stacker needs a custom picker to accommodate the different x-y arrays of rows and columns and different product sizes and shapes. The main expense of such devices is in the drive elements for the individual picker elements. These drives have to date been complicated and thus expensive and sometimes lacked in reliability.

Thus, there is a need for an improved stack picker assembly and thermoforming machine.

SUMMARY

The present invention involves the provision of a molded article stack picker for use with a thermoforming machine. The stack picker includes a first drive assembly and a carrier assembly. A plurality of shafts is rotatably carried by the carrier assembly and define a plurality of stack receiving zones. The shafts have ledge forming projections thereon that upon rotation of a respective shaft move into and out of a respective stack receiving zone. An actuator assembly is operably coupled to the first drive assembly and is operable to simultaneously rotate the shafts to effect movement of the projections into and out of the respective stack receiving zone. A second drive assembly is operably coupled to the carrier assembly to selectively effect movement of the carrier assembly into and out of a stacker magazine.

The present invention also involves the provision of a thermoforming apparatus that includes a forming station operable to simultaneously form a plurality of articles with an attached web in an x-y array of rows and columns. The apparatus also includes a cutting station with a cutting device operable to partially sever the articles from the web. A separating station is provided and includes a plurality of plungers each adapted to engage a respective article and move it relative to a web connecting the articles to effect separation of the articles from each other and the connecting web. A stack magazine is associated with the separating station and is adapted to receive and store separated articles in an x-y array of rows and columns of stacks of articles. A picker assembly is associated with the magazine and includes a plurality of shafts rotatably carried by a carrier assembly. The shafts define a plurality of stack receiving zones corresponding to the array of the stacker. The shafts have ledge forming projections thereon that, upon movement of a respective shaft, move into and out of a respective stack receiving zone. The picker assembly includes an actuator assembly operably coupled to a first drive assembly operable to simultaneously rotate the shafts to effect movement of the projections into and out of the respective stack receiving zone. A second drive assembly is operably coupled to the carrier assembly to selectively effect movement of the carrier assembly into and out of a stack picking zone. The forming station, cutting station and separating station are substantially in line for movement of web therethrough.

The present invention also involves the provision of a method of thermoforming articles. The method includes feeding thermoformable material in sheet form to a forming station along a flow path. The thermoformable material is softened with heat. Force is applied to the softened material to urge it into the mold and into forming engagement with the mold. A plurality of articles are formed in the softened material with connecting web material. The formed articles move along the flow path to a cutting station and are partially severed from the sheet leaving web material adjacent at least some of the articles. The articles are completely severed from the sheet and the web material is separated from the articles. The separated articles are stacked in a plurality of stacks in an x-y array. The count of articles in at least one stack is determined and when a predetermined count of articles in the stack has been reached, the ledge forming members are moved into a position under a respective stack. The stacks are moved laterally out to the side of the flow path defined by the forming and severing stations. The removed stacks are deposited in a collection area.

BRIEF DESCRIPTION OF THE DRAWINGS

FIG. 1 is a side elevation view of a thermoforming machine.

FIG. 2 is a top plan view of the thermoforming machine of FIG. 1.

FIG. 8 is an enlarged fragmentary plan view of a stack of articles with fingers in a stack pick up orientation.

FIG. 9 is a Figure similar to FIG. 8 with the fingers shown in a stack loading and stack discharge orientation.

FIG. 10 is an enlarged fragmentary perspective view of a shaft and shaft drive elements.

Like numbers used throughout this application represent like or similar parts and/or construction.

DETAILED DESCRIPTION OF THE INVENTION

Figure 3:
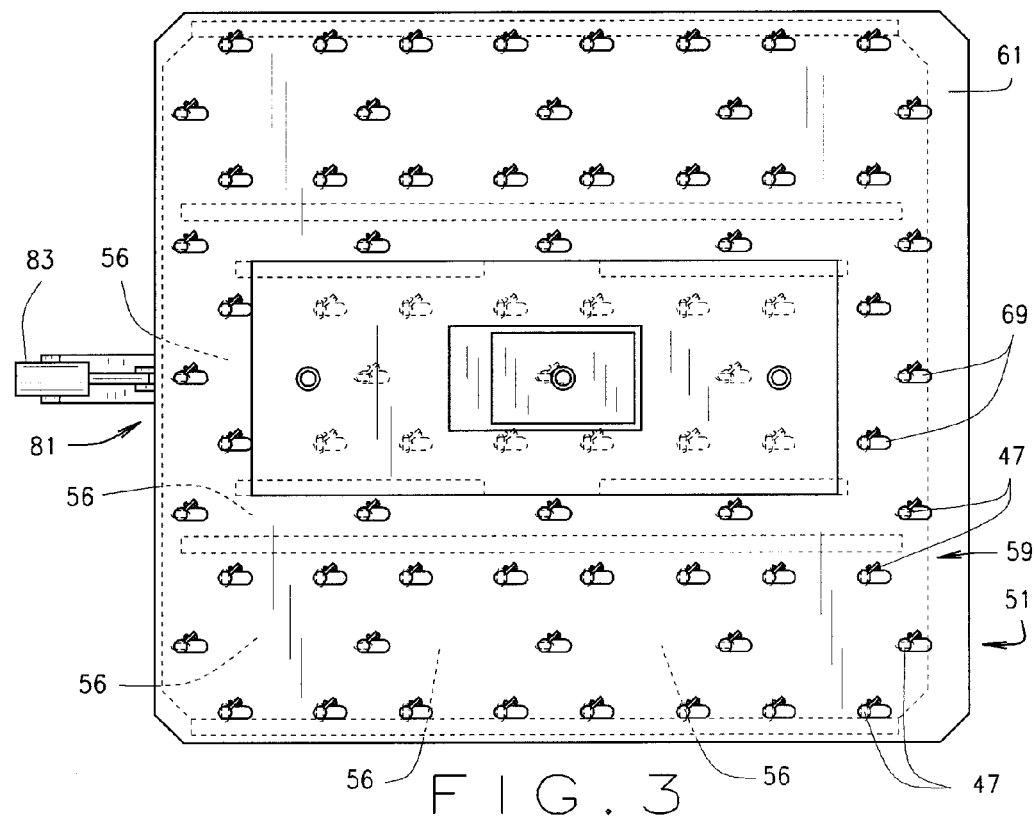
FIG. 3 is an enlarged top plan view of a portion of the stack picker.

While the present invention is susceptible of embodiment in various forms, there is shown in the drawings and will hereinafter be described, presently preferred embodiments with the understanding that the present disclosure is to be considered an exemplification of the invention and is not intended to limit the invention to the specific embodiments illustrated.

The reference numeral 1 designates generally a thermoforming apparatus that utilizes sheet material 2 from a source 3 to form articles 4 in an x-y array of rows R and columns C. The rows are shown as parallel and the columns as parallel. It is to be understood though that non parallel x-y arrays of articles can be provided depending on the configuration of cavities in the forming mold 6. The apparatus 1 is shown as including a forming station 7, a cutting station 9, a separating station 11, a stacking station 12, and a stack picker 14. The apparatus 1 further includes a heater system 16 operable to heat the thermoformable material 2 prior to forming. A heated sheet may be provided directly from an extruder with the extruder functioning as the heater. A waste material collector means 18 can also be provided to accumulate waste material from the sheet material 2.

In one embodiment of the invention, the source 3 of sheet material 2 can be provided from a roll of sheet stock rotatably mounted on a support 19. The material 2 moves through the apparatus 1 in an in line flow path with residual web material being taken up on a takeaway device 20 of the material collector 18. The takeaway device 20 can be used to provide tension in the material 2 as it moves along the processing path through the station 2, 9, 11. The feed of material 2 is incremental to provide processing time at each of the stations 2, 9, 11. The preferred machine 1 utilizes incremental material movement and reciprocating motion of machine elements at the stations 2, 9, 11.

The heater system 16 receives material 2 from the source 3 preferably in the form of an elongate continuous sheet. However, it is to be understood that individual separate sheets could be fed through the machine 1 as an alternate embodiment. The heater system can utilize any suitable heat source or heat sources and preferably uniformly heats a zone of the material 2 to be formed in the forming station 7. A temperature monitoring device 21, such as an infrared thermal imaging system, may be provided to sense and monitor sheet temperature over a large area thereof and provide heater control feedback and/or data for later use for quality control.

The forming station 7 receives heated material between upper and lower platens 22U, 22L. The platens are movably mounted to guide rods 23 to fix their path of movement. The platens 22U, L, move in a linear path reciprocally toward and away from one another to open and close the forming mold 6. The mold 6 includes a female portion 25 positioned adjacent the path of movement of the sheet 2 and receives a portion of the heated sheet therein to form the articles 4 therein. The mold 6 may also include a male assist half and the mold portions are suitably mounted to one or the other or both platens 22. The articles 4 are formed during a machine pause cycle portion (the sheet is paused from movement to advance through the processing stations) by the application of force to the heated material which may be done through a fluid pressure differential such as a vacuum on the female mold side and/or a positive pressure on the side of the sheet opposite the female mold side. After forming of a group of articles 4 positioned in an x-y array, the mold 6 is retracted from the closed or forming position and the formed articles 4 can be assisted in ejection from the mold cavities as with pressurized air or mechanically as with ejector pins. The articles 4 are preferably cooled prior to extraction from the mold cavities as by contact cooling with the mold 6. The thermoforming of sheets is well known in the art and are thus not described in detail herein. During molding, movement of the sheet 2 is stopped in the pause cycle (the sheet is stopped from advancing) for incremental motion of the sheet. After molding, the sheet 2 is advanced during an advance cycle portion of a processing cycle. The movement of the sheet 2 through the illustrated in-line machine can be accomplished with a web takeaway device 20 which is shown as a power driven roller that is driven in a manner to incrementally move the sheet 2 through the in line sheet motion path during sheet movement cycle portion. Other feed and take up devices may be utilized. The sheet movement path is linear as viewed in one plane (e.g., a horizontal plane) along at least one axis but may be serpentine as viewed in another plane (e.g., a vertical plane).

The platens 22U, L, are positioned on opposite sides of the sheet 2. They are moved reciprocally by suitable drive means configured to move the platens 22 in a reciprocal manner and apply force thereto when in a closed configuration. Such means are known in the art and may include linear drive devices such as fluid cylinders (e.g., air and hydraulic cylinders), screw drives and the like. In the illustrated embodiment, the drive means includes a double toggle arrangement 29 that can be operated by a linear drive device as described above, a crank arm or the like.

After articles 4 are molded, the mold 6 opens and the articles are out of the mold, the sheet 2 is advanced. More than one advance movement of the sheet 2 can be utilized to move the sheet and the formed array of articles 4 to the cutting station 9.

The cutting station 9 in the illustrated embodiment is utilized to partially sever the articles 4 from the sheet 2 and to form a web 30 that connects the articles together and provide a sheet portion for cooperation with the takeaway device 20 to effect advancement of the sheet 2 through the machine 1 and in particular, the heater 16, the forming station 7, the cutting station 9 and the separating station 11. Preferably, the sheet 2 moves in line in a plane between the heater 16 and sheet outlet of the separating station 11. The cutting station 9 can include a cutting bed 31 secured to a lower platen 33L and a cutting die 35 secured to an upper platen 33U. The platens 33 are movably mounted to guide rods 36 to fix their path of movement. The platens 33U, L move in a linear path reciprocally toward and away from one another and the cutting die 35 toward and away from the cutting bed 31 with the sheet 2 positioned therebetween. The cutting edges of the cutting die 35 will make cuts through or about through the sheet 2 at least partially around each of the articles 4 but leave the articles at least partially attached to the sheet 2 and to form the connecting web 30. The sheet 2 with the articles 4 and attached web 30 can then be transferred to the separating station 11 for further processing. The platens 33 may utilize drive devices 29 as described above. Alternately and as shown, the lower platen 33L may be fixed in position and only the upper platen 33U need be moved to effect cutting.

The sheet 2 is transferred from the cutting station 9 to the separating station 11 for separation of the articles 4 from the interconnecting web 30 that gets taken up on the takeaway device 20. In a preferred embodiment, the separation can be done by the use of a plunger assembly 41 (FIG. 1.) that is operably connected to a drive assembly 43 to move the assembly into and out of engagement with an x-y array of the articles 4 positioned in the separating station 11. While restraining movement of the web 30, the articles 4 can be separated from the web 30. A preferred means to accomplish separation includes a plate 45 with an x-y array of through openings 46 corresponding to the x-y array of articles 4 on the sheet 2. The through openings are sized smaller than the perimeter of the articles 4 and the articles 4 when freed from the sheet 2 are each forced upwardly through a respective opening to rest on the support plate 45 and be positioned between shafts 47 of a picker assembly 48 positioned at the stacking station 12 in an accumulating storage magazine. The picker assembly 48 is part of the stack picker 14. A plurality of articles 4 may be stacked in each stack 49 in the stacker 12 prior to removal as a stack as described below. The illustrated stacker 12 is of an up feed type which is preferred.

The residual web 30 is suitably removed from the separating station 11 and accumulated. As shown, the web is wrapped into a roll onto the takeaway device 20 preferably incrementally with each incremental movement of the sheet 2 along the feed path through the machine 1.

The picker assembly 48 is operable to selectively remove stacks 49 of articles 4 from the stacker 12 when a predetermined number of articles are indicated as being in a respective stack 49. A controller 50 can be used to count the number of feed cycles of articles 4 to the article accumulating area of the stacker 12 and provide a signal to initiate action of drive means associated with picker device 51 of the picker assembly 48 to effect its movement and operation. The controller 50 can be set for different numbers of feed cycles to provide for different quantities of articles 4 in a stack 49 before the picker assembly is activated. The controller 50 can be any suitable controller such as a PLC.

Figure 4:
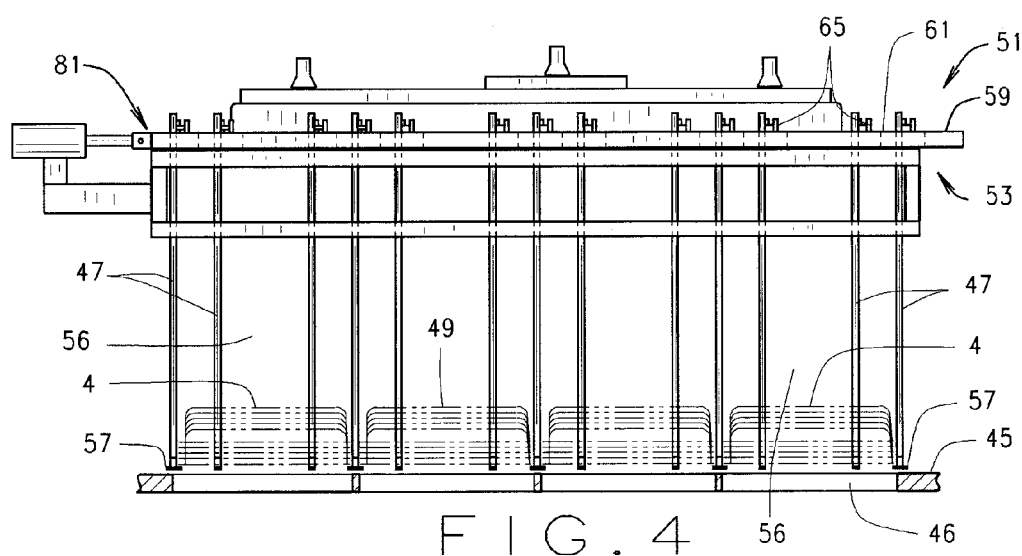
FIG. 4 is an enlarged fragmentary side view of the stacker and stack picker of FIG. 3.
Figure 5:
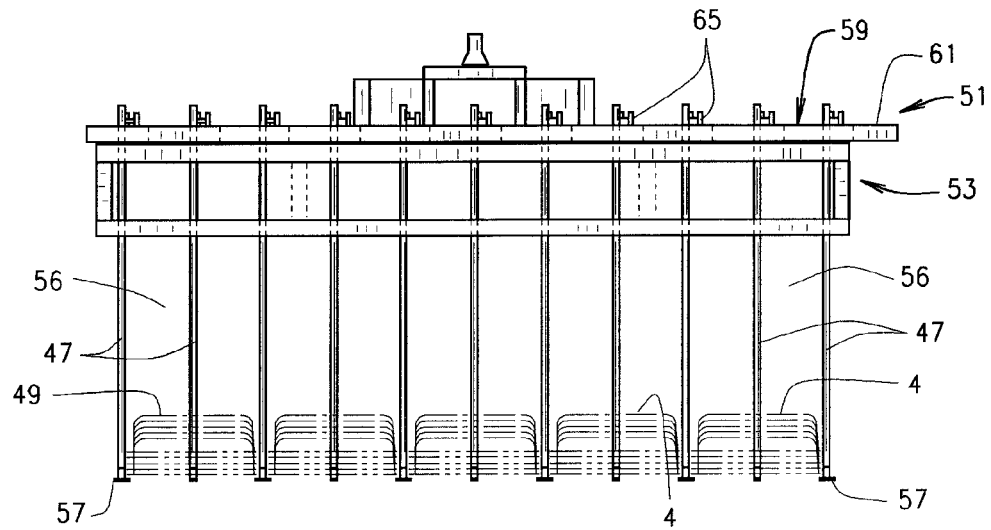
FIG. 5 is an enlarged fragmentary end view of the stack picker of FIG. 3.
Figure 6:
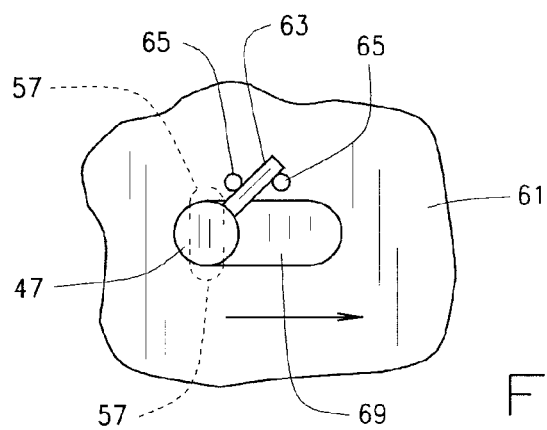
FIG. 6 is an enlarged fragmentary plan view of drive components of the shafts of the stack picker in a first position.
Figure 7:
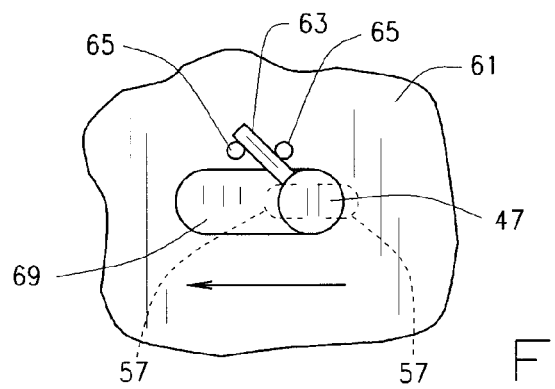
FIG. 7 is an enlarged fragmentary plan view of drive components of the shafts of the stack picker in a second position.

The picker assembly 48 (FIGS. 3-5) includes the picker device 51 and suitable drive means to effect operation of the device 51. The picker device 51 includes a carrier assembly 53. A plurality of shafts 47 are rotatably carried by the carrier assembly 53 and define a plurality of stack receiving zones 56 (FIG. 3). The shafts 47 have ledge forming projections in the form of laterally projecting fingers 57 thereon that upon rotation of a respective shaft 47 move into and out of a respective stack receiving zone 56. As shown, the shafts 47 have a pair of fingers 57 each servicing a respective stack receiving zone 56. The picker device 51 includes an actuator assembly 59 operably coupled to the drive means described below and is operable to simultaneously rotate the shafts 47 to effect movement of the fingers 57 into and out of the respective stack receiving zone 56. The illustrated actuator assembly 59 includes a slide 61 that is movably carried by the carrier assembly 53 for generally linear movement relative thereto. The slide 61 is operably coupled to the shafts 55 to effect selective rotation thereof transforming linear movement into rotary movement. As shown, the shafts 47 each have an arm 63 projecting laterally therefrom with a portion engageable with a respective driver element 65 associated with the slide 61 (FIGS. 6,7). The arms 63 are positioned between a respective pair of drivers 65 carried by the slide 61. The drivers 65 include pins mounted to and projecting from the slide 61 with an arm 63 being positioned between a respective pair of pins. The shafts 47 are each received in a respective slot 69 which permits movement of the slide 61 relative to the shafts. The slots 69 also guide linear movement of the slide 61. The shafts 47 are simultaneously rotated to move the fingers 57 into and out of a respective zone 56 to provide support for a respective stack 49 of articles 4 for picking it up and transporting to a deposit area such as a take away conveyor 71 for further processing and/or use (FIG. 2). An alternate driver arrangement would be to provide an arm 63 with a leg positioned in a respective opening in the slide 61 where the surface of the opening would act as drivers to move the leg and respective arm to effect rotation of a shaft 47.

The picker assembly 48 includes a slide mount assembly 73 that is operable to support and guide movement of the picker device 51 for movement into and out of the stacker 12 to move articles 4 to the conveyor 71. Any suitable slide mount assembly 73 can be utilized and as shown, it includes a pair of spaced apart guide rails 74 positioned at the stacker 12 and engages a support 72 movably mounted on the rails 74 to guide and support in and out movement of the picker device 51 preferably in a plane. In the illustrated embodiment, the slide mount assembly 73 directs one axis of movement while the picker device 51 preferably moves along at least two axes, and as shown, one horizontal and one vertical axis. A drive assembly 75 is operably coupled to the picker device 51 and is operable, upon command from the controller 50, to effect in and out movement which movement is lateral or sideways relative to the motion of the sheet 2 through the machine 1. As shown, the drive assembly 75 includes a linear drive device 76 such as an air cylinder suitably connected to control valving and the controller 50 to selectively effect movement of the picker device 51 between a pickup position and a discharge position for one axis of its movement. The drive assembly 75 includes a second linear drive device 77 such as an air cylinder that is also connected to control valving and the controller 50 and coupled to the picker device 51 to selectively effect its movement between a pickup position where the fingers 57 are positioned adjacent the bottom of a respective stack of articles 4 to a retracted position to start the stack removal process. In the illustrated structure, the movement between the pickup and retracted positions is along an axis generally normal to the axis of movement accomplished by the drive device 76.

A drive assembly 81 is provided to effect rotation of the shafts 47 and hence movement of the fingers 57 between a pickup position under the stacks of articles 4 and a retracted position that allows stacking of articles 4 in a respective stack receiving zone 56 and discharge of the stacks at the takeaway conveyor 71. As described above, the shafts 47 are rotated by movement of the slide 61. The shaft rotation is reciprocal and the movement of the slide 61 is also reciprocal allowing use of a linear drive device 83 such as an air cylinder coupled to the slide 61 and connected to valving and the controller 50 to selectively effect extension and retraction of the cylinder 83. The controller 50 may also include switches or other position sensors to provide signals indicating the locations of the slide 61 and the picker device 51 along its two axes of movement to indicate when moves can be made of the various movable components.

The present invention is better understood by a description of the process utilized in forming the articles 4. Thermoformable material 2 in sheet form is fed to a forming station 7 along a sheet flow path. Preferably, the sheet 2 is elongate and can be used to form articles in a plurality of groups. The illustrated sheet 2 is fed from a roll of sheet material. The thermoformable material is made deformable by the application of heat in the heater system 16 when traveling therethrough. The sheet 2 moves incrementally along the flow path between the various processing stations and remaining web 30 material is taken up on the take up roll 27. A pressure differential is applied to the softened material 2 at the forming station 7 to form the articles 4 as with positive air pressure on the side of the material away from the mold and/or the application of vacuum on the mold side of the material. The articles 4 are preferably cooled during the forming to help provide for rigidity for movement to downstream stations for further processing. In mass production, a plurality of articles 4 are simultaneously formed in the softened material for each molding/processing cycle and remain connected together with connecting web material 30. The formed articles 4 and connecting material move along the flow path to the cutting station 9 and where the articles are partially severed from the sheet 2 leaving web material 30 adjacent at least some of the articles. The articles 4 are then completely severed from the sheet 2 at the separating station 11. The stacking of the articles 4 takes place adjacent the stacking station 12 which in the illustrated structure is positioned above the separating station 11 where part of the separating step is also part of the stacking step. A plunger assembly 41 moves upwardly to engage the articles 4, separate them from one another and the web 30 and force them each through a respective hole 46 in the plate 45 with the web 30 staying below the plate for later take up on the takeaway device 20. The holes 46 in the plate 45 have areas that are smaller than portions of the perimeter of the articles 4 such that once forced through a respective hole, the article will rest on the plate. A plurality of articles 4 are accumulated in each stack of articles until a predetermined count is reached in the article storage magazine of the stacking station 12 where the stacks 49 are accumulated. The stacks are in an x-y array of rows and columns. During a portion of the stacking steps to fill the magazine, the shafts 47 and fingers 57 are stationary in the stacker 12. The count of articles in at least one stack is determined, the ledge forming members 57 are moved into a position under a respective stack by rotating the shafts 47 by movement of the slide 61 during a machine pause cycle portion. The picker device 51 is then elevated to remove the stacks carried thereby from the stacker 12. The elevation of the articles 4 from the stacker 12 is done during a pause cycle of the stacker while article molding is occurring. The stacks 49 are moved laterally out of line with the flow path which can occur during forming and severing when the sheet is stationary and/or during the cycle period when the sheet 2 is advancing along the flow path. The picked stacks of articles are then moved to the side of the machine to a collection area such as the take away conveyor 71. During the elevation of the articles 4 and their movement to be deposited for takeaway, the molding, cutting, separating and stacking of articles can continue with normal cycle times. During stacking and depositing, the fingers 57 are rotated to a retracted position to provide for the articles 4 to move unimpeded thereby. During pickup and carriage of articles 4, the fingers 57 are oriented in an extended position under the respective stack of article extending into a respective stack receiving zone. Movement of the finger 57 between an extended position and retracted position is effected by rotation of the shafts 47. The movement of the fingers 57 also includes generally vertical movement of the shafts 47 to a position where the ledge forming members are beneath the level of a bottom positioned article 4 in a respective stack of articles. The movement of the fingers 47 can occur during article stacking and/or a machine pause cycle portion. The shaft actuator or slide 61 is moved linearly in a reciprocating manner to effect the rotary movement of the shafts 47 selectively in one of two directions.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be limited to such specific embodiments. Indeed, various modifications of the described modes for carrying out the invention are intended to be within the scope of the following claims.

What is claimed is:

1. A molded article stack picker for use with a thermoforming machine, the stack picker comprising:
   a first drive assembly;
   a carrier assembly;
   a plurality of shafts rotatably carried by the carrier assembly and defining a plurality of stack receiving zones, said shafts having ledge forming projections thereon that upon rotation of a respective shaft move into and out of a respective stack receiving zone;
   an actuator assembly operably coupled to the first drive assembly operable to simultaneously rotate the shafts to effect movement of the projections into and out of the respective stack receiving zone; and
   a second drive assembly operably coupled to the carrier assembly to selectively effect movement of the carrier assembly into and out of a stack picking zone.

2. The picker of claim 1 wherein the actuator assembly including a slide movably carried by the carrier assembly for generally linear movement relative thereto by the first drive assembly, said slide being operably coupled to the shafts to effect selective rotation thereof.

3. The picker of claim 2 wherein the shafts having a first arm projecting laterally therefrom and having a portion engageable with a respective drive element associated with the slide.

4. The picker of claim 3 wherein the first arms being positioned between a respective pair of drive elements carried by the slide.

5. The picker of claim 4 wherein the drive elements including pins projecting from the slide with a first arm being positioned between a respective pair of said pins.

6. The picker of claim 4 wherein the drive elements including end wall portions of openings in the slide.

7. The picker of claim 2 wherein the first drive assembly including a linear power drive device.

8. The picker of claim 7 wherein the second drive assembly being operable to effect movement of the carrier assembly along at least two axes.

9. The picker of claim 1 associated with a thermoforming apparatus.

10. The picker of claim 9 wherein the thermoforming apparatus being of an in line construction with a thermoforming station, a cutting station and a separating station with the carrier assembly being associated with the separating station.

11. A thermoforming apparatus including:
a forming station operable to simultaneously form a plurality of articles with an attached web in an x-y array;
a cutting station with a cutting device operable to partially sever the articles from the web;
a separating station with a plurality of plungers each adapted to engage a respective article and move an article relative to a web connecting the articles to effect separation of the articles from the connecting web;
a magazine associated with the separating station and adapted to receive and store separated articles in an x-y array of stacks of articles;
a picker assembly associated with the magazine, said picker assembly including a plurality of shafts rotatably carried by a carrier assembly and defining a plurality of stack receiving zones, said shafts having ledge forming projections thereon that upon movement of a respective shaft move into and out of a respective stack receiving zone, said picker assembly including an actuator assembly operably coupled to a first drive assembly operable to simultaneously move the shafts to effect movement of the projections into and out of the respective stack receiving zone, and a second drive assembly operably coupled to the carrier assembly to selectively effect movement of the carrier assembly into and out of the magazine; and wherein
the forming station, cutting station and separating station being substantially in line for movement of web therethrough.

12. The apparatus of claim 11 wherein the actuator assembly and first drive assembly being operable to effect rotational movement of the shafts.

13. The apparatus of claim 12 wherein the second drive assembly being operable to move the carrier assembly laterally of the separating station.

14. The apparatus of claim 13 wherein the second drive assembly including a first actuator operable to move the carrier assembly generally horizontally into and out of the magazine and a second actuator operable to move the carrier assembly and shafts generally vertically in the magazine.

15. The apparatus of claim 14 wherein the first drive assembly, first actuator and second actuator including linear drive devices.

16. The apparatus of claim 11 including a controller, the controller including a counter operable to count the number of articles in a stack in the magazine and provide a signal to actuate the first and second drive assemblies when a predetermined number of articles are indicated as being in a stack in the magazine.

17. A molding machine comprising:
an article forming station adapted to simultaneously form a plurality of connected articles in an x-y array in a sheet of material;
a separating station downstream of the forming station and operable to effect separation of the formed articles from an interconnecting web portion of the sheet;
a stacker operable to form a plurality of spaced apart stacks of articles positioned in an x-y array, wherein said forming station, separating station and stacker being in line;
a web removal assembly operable to accumulate the separated web;
a picker assembly adjacent the stacker and having a plurality of stack receiving zones each bounded by a plurality of lift members each having a respective article support member, said lift members being mounted to a movable support, said picker assembly also including a first drive and a second drive, said first drive being operably connected to the lift members and operable to selectively move the lift members between an article lift position and an article release position, said second drive being operably connected to the support and operable to selectively move the support and lift members between a formed article pick position and discharge position; and
a controller operably connected to the first and second drive means and operable to selectively effect operation thereof when a predetermined quantity of formed articles is accumulated in a stack in the stacker.

* * * * *